United States Patent [19]

Slepian et al.

[11] Patent Number: 5,764,469
[45] Date of Patent: *Jun. 9, 1998

[54] APPARATUS FOR PROTECTING ELETRONIC DEVICES IN A VEHICLE'S ELECTRONIC SYSTEM AND FOR PREVENTING DISCHARGE OF THE VEHICLE'S BATTERY

[75] Inventors: Harvey Slepian, Peoria; Loran Sutton, East Peoria, both of Ill.

[73] Assignee: TAS Distributing Co., Inc., Peoria, Ill.

[ * ] Notice: The term of this patent shall not extend beyond the expiration date of Pat. No. 5,615,076.

[21] Appl. No.: 814,619

[22] Filed: Mar. 10, 1997

Related U.S. Application Data

[63] Continuation-in-part of Ser. No. 500,506, Jul. 11, 1995, Pat. No. 5,615,076.
[51] Int. Cl.[6] ............................................ H02H 3/20
[52] U.S. Cl. ....................... 361/92; 361/90; 361/115
[58] Field of Search ........................... 361/90, 115, 92, 361/72, 94; 320/32

[56] References Cited

U.S. PATENT DOCUMENTS

| | | | |
|---|---|---|---|
| 3,991,357 | 11/1976 | Kaminski | 320/32 |
| 4,255,697 | 3/1981 | Buhler, III | 320/6 |
| 4,385,240 | 5/1983 | Sato | 307/10 R |
| 4,733,100 | 3/1988 | Nusairat et al. | 307/9 |
| 4,964,011 | 10/1990 | Sternglass | 361/88 |
| 5,170,151 | 12/1992 | Hochstein | 340/636 |
| 5,204,991 | 4/1993 | Law | 307/10.7 |
| 5,221,861 | 6/1993 | Kinsell | 307/9.1 |
| 5,327,068 | 7/1994 | Lendrum et al. | 320/13 |
| 5,381,295 | 1/1995 | Rund et al. | 361/92 |
| 5,615,076 | 3/1997 | Slepian et al. | 361/90 |

*Primary Examiner*—Jeffrey A. Gaffin
*Assistant Examiner*—Stephen Jackson
*Attorney, Agent, or Firm*—Haynes and Boone, L.L.P.

[57] ABSTRACT

An apparatus to provide protection for electronic devices which receive power for their operation at least in part from a vehicle's electrical system and battery. The electronic device protecting apparatus has an electrical system voltage sensor, an engine start sensor, and an electronic device decoupler interconnected such that the electronic devices are decoupled from the electrical system and battery when the battery voltage drops below a predetermined level and when the engine is being started. The preferred apparatus allows the operator to select between a warning that system voltage is low and an automatic restart of the vehicle's engine and charging system. The apparatus further includes a bypass function to accommodate electronic devices which draw temporarily high current.

34 Claims, 3 Drawing Sheets

APPARATUS FOR PROTECTING ELETRONIC DEVICES IN A VEHICLE'S ELECTRONIC SYSTEM AND FOR PREVENTING DISCHARGE OF THE VEHICLE'S BATTERY

This application is a Continuation-in-Part of prior U.S. patent application Ser. No. 08/500,506 filed Jul. 11, 1995 and issued on Mar. 25, 1997 as U.S. Pat. No. 5,615,076, for which benefit under 35 U.S.C. § 120 is claimed, and which is hereby incorporated by reference as if reproduced in its entirety.

BACKGROUND

The present invention relates generally to the protection of electronic devices from voltage spikes and, in a preferred embodiment thereof, more particularly provides apparatus for protecting electronic devices which are powered by a vehicle's electrical system and for preventing the electronic devices from discharging the vehicle's battery.

Quite frequently, electronic devices or accessories are installed in a vehicle by the vehicle's owner. These electronic devices may include radar detectors, stereo radios, tape decks, compact disk players, citizens band radios, cellular telephones, televisions, satellite receivers, etc. Furthermore, virtually every new vehicle manufactured today comes equipped with a multitude of electronic equipment.

Typically, one or more of these electronic devices are wired into the vehicle's electrical system so that the devices may be powered by the vehicle's battery whether or not the vehicle's engine is running. If, the engine is not running, however, the vehicle's battery is not being charged by the vehicle's charging system. This means that the vehicle's battery will be discharging if the electronic devices are operated while the vehicle's engine is not running. In addition, the vehicle's charging system may malfunction such that, even with the engine running, the vehicle's battery will be discharging while the electronic devices are being operated.

Further, many of these electronic devices utilize the vehicle's battery power even when they are turned off. For example, some of the electronic devices maintain data in memory chips which must remain powered to continue storing the data. Other devices have clocks, status lights, etc. which are constantly powered by the vehicle's battery. Thus, discharging of the vehicle's battery occurs even when these devices are turned off.

A few electronic devices, such as vehicle theft alarm systems, are specifically intended to be operated by the vehicle's battery when the engine is not running. In this case, the vehicle's owner will actually turn the device on when the engine is not running, knowing that the device will be operating solely on power supplied by the vehicle's battery.

In addition, electronic devices are frequently left turned on by the vehicle's owner inadvertently. For example, a radar detector, typically receiving power through the vehicle's cigarette lighter receptacle, may be left on when the driver reaches a destination, turns the vehicle's engine off, and exits the vehicle. Since cigarette lighter receptacles usually remain connected to the vehicle's battery when the engine is not running, the radar detector will be discharging the battery. On a Class 8 vehicle equipped with a satellite system and/or a sleeper unit, the satellite system will usually be left on by the vehicle's operator at all times. Additionally, the operator may fall asleep while watching television and resting in the sleeper unit during a mandatory rest period.

Further complicating matters, many of these electronic devices do not draw a constant amount of power or current from the vehicle's electrical system. In particular, some devices, such as an electric engine heater, draw very high currents when they are started but much less current after they have been operated a while.

In addition to the problem of electronic devices discharging the vehicle's battery, these electronic devices may be damaged by voltage spikes when the vehicle is being started. Large voltage spikes are created in a vehicle's electrical system when the engine is started. These voltage spikes are even larger when the vehicle's battery has been significantly discharged. Thus, electronic devices connected to the vehicle's electrical system are in danger of damage from voltage spikes when the vehicle's engine is being started, and this danger is greater when the vehicle's battery has been significantly discharged.

Solutions have been proposed to the problems associated with electronic devices discharging the vehicle's battery and being damaged when the engine is started. One solution has been to interconnect a switch between the vehicle's electrical system and an electronic device. The switch is turned off by a detecting circuit when the engine is not running. The detecting circuit senses whether or not the engine is running by monitoring the "noise" in the vehicle's electrical system which is present when the engine is running. If "noise" is present, the detecting circuit turns the switch off, thereby disconnecting the electronic device from the vehicle's electrical system.

This solution has several disadvantages, however. One disadvantage is that a switch and detecting circuit must be used for each electronic device installed in the vehicle. Another disadvantage is that "noise", a potentially harmful quality for an electronic device, is the very thing that allows the electronic device to receive power. Yet another disadvantage of this solution is that it does not solve the problem of discharge of the vehicle's battery when the engine is running.

Another solution which has been proposed is to provide a second power source, such as a second battery, exclusively for noise-sensitive electronic devices. The second battery is charged by the vehicle's normal battery when the voltage in the second battery falls below a predetermined voltage. During operation of the electronic devices, the second battery is the exclusive power source for the electronic devices.

However, this solution also has several disadvantages. One such disadvantage that the electronic devices may completely discharge the second battery if the vehicle's engine is not running. Another disadvantage is that the operator must turn off the electronic devices in order for the second battery to be charged by the normal battery. Furthermore, the second battery may discharge the normal battery if, for example, the second battery develops a bad cell or a short therein.

Various other solutions have been proposed, each of which solve only a portion of the problems associated with powering and protecting electronic devices installed in vehicles. Unfortunately, most if not all of these solutions thereby create additional problems and inconveniences which make them undesirable.

Additionally, applicant is not aware of any existing solutions which also provide a warning to the vehicle's operator that the battery is being discharged below an acceptable level. Such a warning would be useful to the operator as it would enable the operator to turn off electronic devices and thereby conserve the remaining battery charge level. It would also signal to the operator that there may be a malfunction in the vehicle's charging circuit. Alternatively, this low-voltage warning signal could be used to automatically restart the vehicle's engine and charging system to recharge the battery.

From the foregoing, it can be seen that it would be quite desirable to provide an apparatus which protects electronic devices from voltage spikes while starting a vehicle's engine, prevents discharge of the vehicle's battery whether or not the engine is running, and allows the operator to select either a simple warning when the battery is being discharged below an acceptable level, and/or an automatic re-start of the engine and its charging system. In addition, any such apparatus should be able to account for short duration drops in the vehicle's electrical system voltage due to electronic devices drawing temporarily high currents. It is accordingly an object of the present invention to provide such an apparatus.

SUMMARY OF THE INVENTION

In carrying out the principles of the present invention, in accordance with an embodiment thereof, an apparatus for protecting electronic devices is provided. Electronic devices installed in a vehicle are protected by preventing unacceptable discharge of the vehicle's battery, isolating the electronic devices from the vehicle's electrical system while the vehicle's engine is being started, and warning the vehicle's operator when the battery voltage falls below an acceptable level and providing a selective means for automatically restarting the vehicle's engine and charging system. In addition, the apparatus includes means for accommodating electronic devices with high initial current draw such that the apparatus does not disconnect the electronic devices from the vehicle's electrical system each time system voltage is lowered due to a device drawing temporarily high current. Specifically, when the apparatus receives a signal indicating such a device is being started, the apparatus bypasses its normal operation of sensing system voltage and connecting or disconnecting electronic devices based upon the system voltage level. When this bypass input signal is received, the apparatus remains in steady state until the signal is removed, and for a predetermined delay thereafter.

In broad terms, the preferred embodiment of the present invention provides a circuit for protecting an electronic device operatively installed in a vehicle from voltage spikes and surges produced when the vehicle is started, the vehicle having an electrical system which connects the electronic device to a battery included in the electrical system, and for preventing the electronic device from discharging the battery below an acceptable level. The circuit includes first means for determining when the battery has been discharged below a first voltage level; first means connected to the first determining means for disconnecting the battery from the electronic device when the battery has been discharged below the first voltage level; means for sensing when the vehicle is being started; second means connected to the sensing means for disconnecting the electronic device from the electrical system when the vehicle is being started; second means for determining when the battery is being charged above a second voltage level; means for reconnecting the electronic device to the electrical system, after the electronic device has been previously disconnected from the electrical system by the first disconnecting means, when the second determining means indicates the battery is being charged above the second voltage level; second means for reconnecting the electronic device to the electrical system, after the electronic device has been previously disconnected from the electrical system by the second disconnecting means, when the sensing means indicates the vehicle is not being started; third means for determining when the battery has been discharges below a third voltage level, the third voltage level being higher than the first voltage level; automatic restart means connected to the third determining means for automatically starting the vehicle and recharging the vehicle's battery; and bypass means which overrides the first, second and third determining means and prevents the apparatus from connecting or disconnecting electronic devices, when a bypass input signal is received from an electronic device requiring temporarily high current.

BRIEF DESCRIPTION OF THE FIGURES

In the following, embodiments of the present invention will be explained in detail on the basis of the drawings, in which.

DETAILED DESCRIPTION

Figure 1:
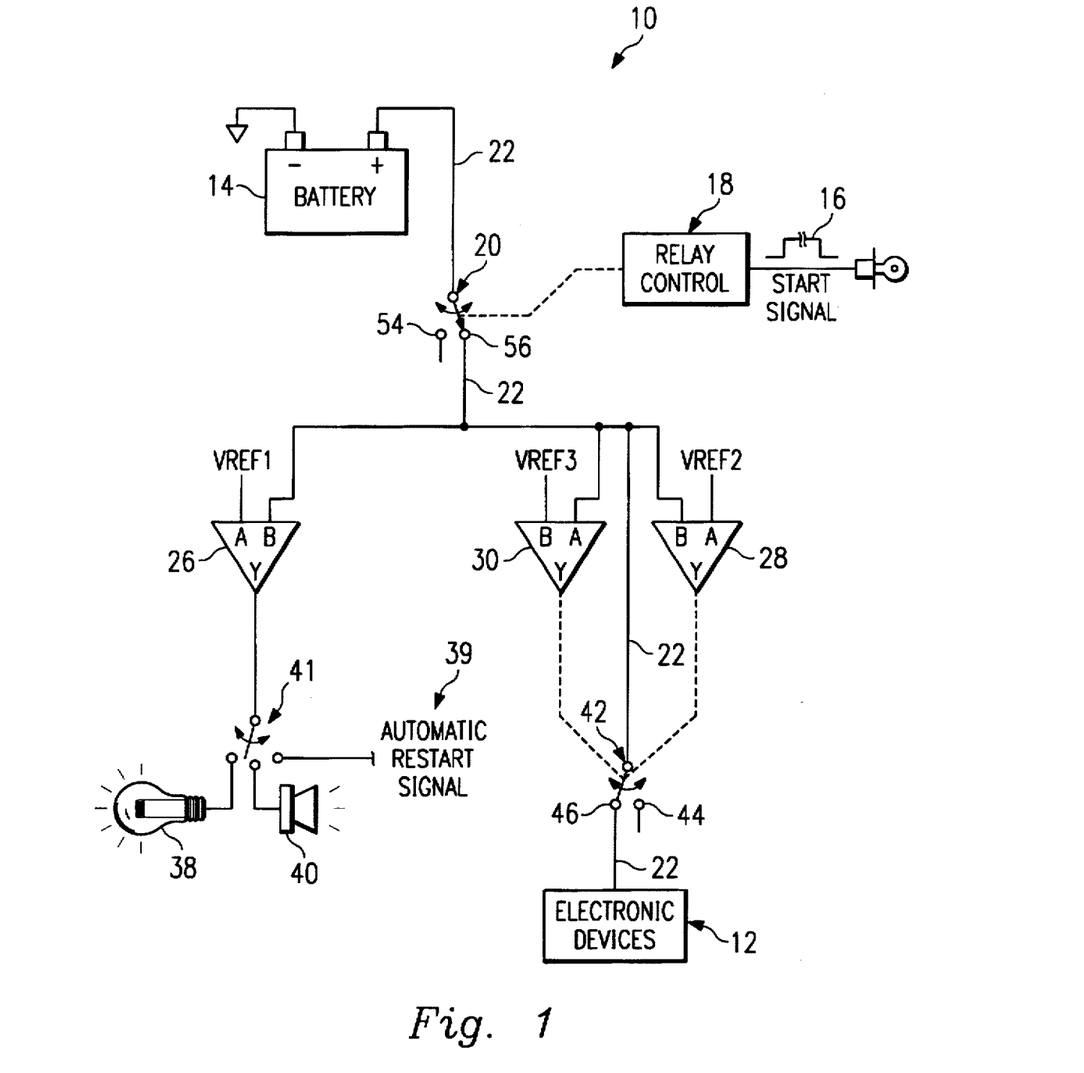
FIG. 1 is a simplified block diagram of an electronic device protecting apparatus embodying principles of the present invention.

FIG. 1 is a block diagram generally illustrating apparatus 10 for protecting electronic devices, which apparatus embodies principles of the present invention. Electronic devices 12 installed in a vehicle (not shown) are disconnected and reconnected to the vehicle's battery 14 in a unique manner which protects the electronic devices from spikes and surges which occur during starting of the vehicle's engine, and prevents the electronic devices from draining the battery 14 to an unacceptably low voltage.

When the vehicle is started a start signal 16 is produced. The start signal 16 is received by a relay controller 18 which controls the activation of a relay 20 situated in a power line 22 connecting the electronic devices 12 to the battery 14. The relay 20 is normally closed. Relay controller 18 opens the relay 20 when it receives the start signal 16, thus disconnecting the electronic devices 12 from the battery 14.

Relay controller 18 opens the relay 20 for the duration of the start signal 16 and, in addition, maintains the relay 20 open for a predetermined period of time after the start signal has discontinued. The delay period assures that the vehicle has reached a steady state before the electronic devices 12 are reconnected to the battery 14. While the relay 20 is open, the electronic devices 12 are powered by a second battery 24, commonly referred to as an isolation battery, which is not shown in FIG. 1, but is described hereinbelow in relation to the detailed circuit diagram illustrated in FIG. 2.

First, second, and third comparators 26, 28, and 30 are connected to the power line 22 between the battery 14 and the electronic devices 12. These comparators 26, 28, 30 are of conventional design and are used in the apparatus 10 to compare the voltage in the power line 22 to respective predetermined reference voltages VREF1, VREF2, and VREF3. The comparators 26, 28, 30 are of a type that have three terminals—A, B, and Y—such that when the voltage on terminal A exceeds the voltage on terminal B, a voltage is produced on terminal Y. Conversely, when the voltage on terminal B exceeds the voltage on terminal A, no voltage is produced on terminal Y (terminal Y is effectively grounded).

When an electronic device which draws temporarily high current is started, comparators 26, 28 and 30 are essentially bypassed. When such high current devices are started, a bypass input signal 260 is produced (not shown). The bypass input signal 260 is received by means for initiating the bypass circuit 250 (not shown). This bypass circuit 250 and bypass input signal 260 are described hereinbelow in relation to the detailed circuit diagram illustrated in FIG. 3.

Warning comparator 26 is connected at its terminal B to power line 22. Terminal A of warning comparator 26 is connected to a first predetermined reference voltage VREF1. Thus, when the voltage in the power line 22 drops below the first reference voltage VREF1, a voltage is produced at terminal Y of warning comparator 26.

The function of warning comparator 26 is to warn the vehicle's operator when the battery 14 has been discharged below an acceptable level (the voltage set as VREF1). The voltage at terminal Y of warning comparator 26 may be selectively directed to a visible indicator, such as light 38, or an audible indicator, such as speaker 40, by means of a selector switch 41. In addition, the output of comparator 26 may be selectively used to send an automatic restart signal 39 to a means for automatically restarting the vehicle engine and charging system, thereby initiating a recharge of the vehicle's battery 14.

Disconnect comparator 28 is connected at its terminal B to power line 22, and at its terminal A to a second predetermined reference voltage VREF2. Thus, when the voltage in the power line 22 drops below the second reference voltage VREF2, a voltage is produced at terminal Y of disconnect comparator 28. The voltage produced at terminal Y of disconnect comparator 28 is used to control a latching switch 42 in the power line 22 between the disconnect comparator and the electronic devices 12.

The purpose of disconnect comparator 28 is to disconnect the electronic devices 12 from the battery 14 before the battery is discharged below the second reference voltage VREF2. This ensures that the battery 14 will not be discharged below a voltage needed to start the vehicle. The second reference voltage VREF2 is set at a somewhat lower voltage than the first reference voltage VREF1. Thus, the operator of the vehicle is first warned that the battery 14 is being overly discharged by means of the warning comparator 26, and then, if sufficient remedial measures are not taken and the battery discharges further, disconnect comparator 28 removes the load of the electronic devices 12 from the battery to prevent further discharge.

It is important to understand that latching switch 42, controlled, at least in part, by the voltage at terminal Y of disconnect comparator 28 will latch to its off position 44 when a voltage exists at terminal Y of the disconnect comparator, but will not latch to its on position 46 when the voltage is subsequently removed from terminal Y of the disconnect comparator. It remains "latched" in the off position 44 even when the stimulus that turned it off is removed (that is, when the voltage in power line 22 again exceeds second reference voltage VREF2). Thus, if the battery 14 has been discharged below the second reference voltage VREF2 such that disconnect comparator 28 activates the latching switch 42 to its off position 44, the disconnect comparator will not subsequently activate the latching switch to its on position 46 when the voltage in the power line 22 again exceeds the second reference voltage VREF2 (for example, when the vehicle has been started and its alternator is supplying power sufficient to charge the battery and operate the electronic devices 12).

Reconnect comparator 30 is connected at its terminal A to the power line 22, and at its terminal B to a third predetermined reference voltage VREF3. When the voltage in the power line 22 exceeds the third reference voltage VREF3, a voltage is produced at terminal Y of reconnect comparator 30. The voltage produced at terminal Y of reconnect comparator 30 is used to control the latching switch 42 in a manner similar to that described above in regard to the disconnect comparator 28, but in reverse. When a voltage is produced at terminal Y of reconnect comparator 30, latching switch 42 is activated to its on position 46.

The third reference voltage VREF3 is set at a voltage which is high enough to indicate that, for example, the vehicle's alternator is supplying sufficient power to charge the battery 14 and operate the electronic devices 12, or a new battery has been installed. Thus, the third reference voltage VREF3 is set at a voltage greater than the second reference voltage VREF2 or the first reference voltage VREF1. The purpose of reconnect comparator 30 is to reconnect the electronic devices 12 to the battery 14 when, the battery having previously been disconnected from the electronic devices due to unacceptable discharging, the battery is again charged to an acceptable level or the vehicle's alternator is producing power sufficiently.

Preferred voltages for the first, second, and third reference voltages, VREF1, VREF2, and VREF3 have been determined by the applicant to be approximately 12.5, 12.2, and 13.8 volts, respectively, for a nominal 12 volt vehicle electrical system. These voltages may be varied without departing from the principles of the present invention.

Thus, using the above-identified preferred reference voltages, an exemplary operational sequence of the apparatus 10 would be as follows:

1. With the vehicle turned off and electronic devices 12 being operated, battery 14 has a voltage of approximately 13 volts, switch 20 is closed, and latching switch 42 is closed;

2. The battery 14 is being discharged to an unacceptably low voltage, the voltage in power line 22 approaches 12.5 volts;

3. When the voltage in power line 22 falls below 12.5 volts, warning comparator 26 activates a visible or audible alarm 38 or 40 and/or generates an automatic restart signal to initiate means for automatically restarting the vehicle's engine and charging system;

4. If no measures are taken to prevent further discharge of the battery 14, the voltage in the power line 22 continues to drop and approaches 12.2 volts;

5. When the voltage in power line 22 falls below 12.2 volts, disconnect comparator 28 activates latching switch 42 to its open position 44, thereby removing the load of the electronic devices 12 from the battery 14;

6. When the voltage in the power line 22 next exceeds 13.8 volts, such as when the vehicle has been started and its alternator is operating or the battery 14 has been replaced or recharged, reconnect comparator 30 activates latching switch 42 to its on position 46, thereby reconnecting the electronic devices 12 to the battery 14.

This sequence assumes that there is no bypass input signal 260 indicating an electronic device with temporarily high current has been started. If such a bypass input signal 260 is received, the voltages on terminals A and B of comparators 26, 28, and 30 are overridden, the comparators are essentially bypassed, and the apparatus is maintained in steady state. See the discussion of FIG. 3 hereinbelow for a detailed description of the bypass circuit 250 implementing the bypass feature.

Figure 2:
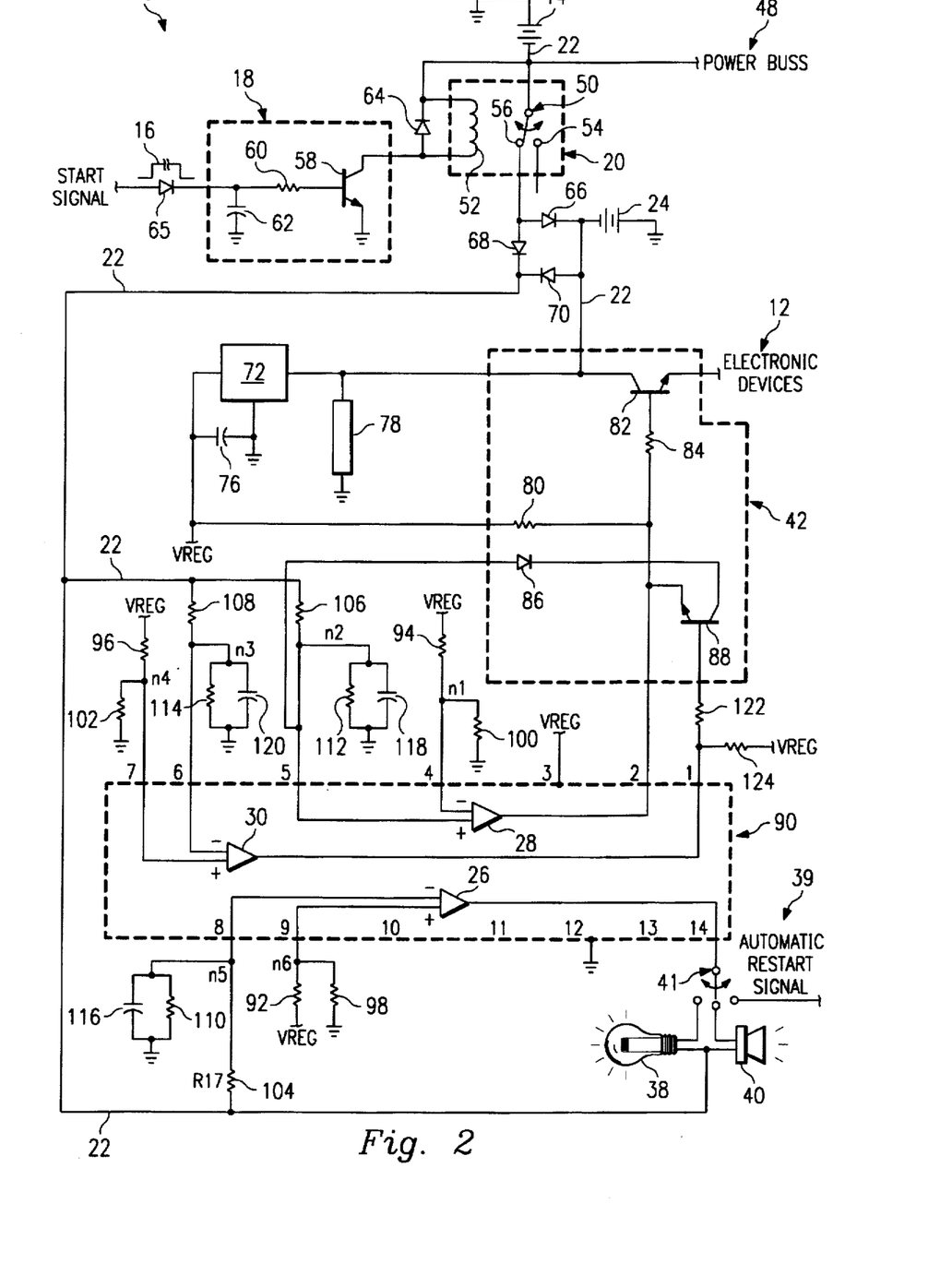
FIG. 2 is a schematic circuit diagram illustrating in detail the component parts thereof.

Turning now to FIG. 2, a detailed circuit diagram of the apparatus 10 is illustrated, showing the individual components of a preferred embodiment of the present invention. The apparatus 10 is interconnected to the vehicle's electrical system by connecting the vehicle's power buss 48 (representing all of the power-consuming equipment not protected by the apparatus, and the point of connection of the vehicle's power-generating alternator) to the power line 22 between the battery 14 and the relay 20. In this manner, the vehicle's power buss 48 may discharge and/or charge the battery 14 as in conventional vehicle electrical systems.

The relay 20 is of conventional construction and includes a normally-closed switch 50 and a coil 52. When the switch 50 is in its closed position 56, the battery 14 is connected to the power line 22 on the other side of the relay 20. When the coil 52 is energized, the switch 50 is activated to its open position 54, thereby isolating the electronic devices 12 from the battery 14 and the power buss 48.

The coil 52 is energized when a start signal 16 originating at the vehicle's starter is received by the relay controller 18. Diode 65 ensures that current from the relay controller 18 cannot pass back to the vehicle's starter. The relay controller 18 includes a transistor 58 connected at its emitter terminal to ground and at its collector terminal to the relay coil 52, a resistor 60, and a capacitor 62 connected to ground.

When the start signal 16 is received at the base terminal of transistor 58, the relay coil 52 is energized, activating switch 50 to its open position 54. A steering diode 64 ensures that current can only pass through the coil 52 to ground through transistor 58. When the start signal 16 is no longer being received, capacitor 62 maintains a voltage on the base terminal of the transistor 58 for a predetermined delay period. Applicant's preferred delay period is approximately ten seconds.

With the relay switch 50 in its closed position 56, current passes from the battery 14 through the relay 20 to a set of three diodes 66, 68, 70. Diodes 68 and 70 are steering diodes, and diode 66 is a high current diode. Diodes 66 and 68 prevent any current from passing back to the battery 14 or power buss 48. In this way, a discharged or shorted battery 14, or equipment operated by the power buss 48, cannot discharge the isolation battery 24 whose purpose is to provide power to the electronic devices 12 when the relay 20 is open. Diode 70 permits current from the isolation battery 24 to pass to the power line 22.

A regulated power supply 72 of conventional construction is connected to the power line 22 and produces a constant, regulated voltage VREG. Applicant's preferred regulated voltage VREG is five volts. A capacitor 76 and transorb 78 filter noise from the regulated voltage VREG and the power line 22, respectively. A resistor 80 connects the regulated voltage VREG to the latching switch 42.

The latching switch 42 operates to permit connecting and disconnecting of the power line 22 to the electronic devices 12 as described hereinabove in the description regarding FIG. 1. Latching switch 42 includes a power transistor 82, a resistor 84, a steering diode 86, and a latching transistor 88. When sufficient voltage is present at the base terminal of power transistor 82, its collector terminal, which is connected to the power line 22, is connected to its emitter terminal, which, in turn, is connected to the electronic devices 12. Thus, when sufficient voltage is present at the power transistor 82 base terminal, battery 14 (or isolation battery 24 if relay 20 is open) is connected to the electronic devices 12. Latching transistor 88 ensures that, when the sufficient voltage is no longer present at the power transistor 82 base terminal (due to voltage in the power line 22 falling below the second predetermined reference voltage VREF2), the sufficient voltage will not reach the power transistor 82 base terminal until the voltage in the power line 22 reaches the third predetermined reference voltage VREF3 (see FIG. 1), thereby "latching" the power transistor 82. The manner in which latching transistor 88 acts to latch the power transistor 82 will be clear upon consideration of the further description of the circuit diagram hereinbelow.

An integrated circuit 90 having terminals numbered 1 through 14 contains it least three comparators 26, 28, 30 as described hereinabove in the description of the block diagram illustrated in FIG. 1. Power for operation of the integrated circuit 90 is supplied from the regulated voltage VREG to pin 3, and a ground connection is provided at pin 12. The A terminals of these comparators 26, 28, 30 are identified in FIG. 2 by the "+" symbol, and the B terminals are identified by the "−" symbol.

Note that the regulated voltage VREG is connected to one of the terminals of each comparator 26, 28, 30 through resistors 92, 94, 96, 98, 100, 102 to produce first, second, and third predetermined reference voltages VREF1, VREF2, VREF3 at pins 9, 4, and 7, respectively, of integrated circuit 90. Thus, resistors 92, 94, 96, 98, 100, 102 function to divide the regulated voltage VREG into three reference voltages VREF1, VREF2, and VREF3.

Power line 22 is also connected to one terminal of each of the comparators 26, 28, 30. The voltage in power line 22 is connected to pins 8, 5, and 6 of integrated circuit 90 through resistors 104, 106, 108, 110, 112, 114 and capacitors 116, 118, 120. Resistors 104, 106, 108, 110, 112, 114 function to divide the voltage in power line 22 for comparison to reference voltages VREF1, VREF2, and VREF3 by comparators 26, 28, and 30, respectively. Capacitors 116, 118, 120 function to provide a predetermined delay between the time a change in voltage appears in power line 22 and the changed voltage is compared by the comparators 26, 28, 30. Applicant's preferred delay time is approximately one second.

Applicant's preferred predetermined voltages for VREF1, VREF2, and VREF3 were disclosed hereinabove to be approximately 12.5, 12.2, and 13.8 volts, respectively. The corresponding divided voltages at pins 9, 4, and 7 of integrated circuit 90 are approximately 2.99, 2.89, and 3.40 volts, respectively. Thus, when the voltage at pin 8 of integrated circuit 90 drops to approximately 2.99 volts, corresponding to a voltage in power line 22 of approximately 12.5 volts, a voltage is produced at pin 14 of integrated circuit 90 by comparator 26, turning on light 38 or speaker 40 to warn the vehicle's operator. Alternatively, the output at pin 14 can be selectively directed as an automatic restart signal 39 coupled to means for automatically restating the vehicle's engine and charging system.

When the voltage at pin 5 of integrated circuit 90 drops to approximately 2.89 volts, corresponding to a voltage in power line 22 of approximately 12.2 volts, the voltage at pin 2 of integrated circuit 90 goes low. Since pin 2 of integrated circuit 90 is connected to the base terminal of power transistor 82, when the voltage at pin 2 goes low, power transistor 82 turns "off", thereby disconnecting the electronic devices from the power line 22. Note also, that pin 2 of integrated circuit 90 is connected to the emitter terminal of latching transistor 88, and the collector terminal of the latching transistor is connected to pin 5 of integrated circuit 90 (the pin having the voltage being compared to the second reference voltage VREF2). Thus, as long as latching transistor 88 is "on" and providing a conductive path from pin 5 to pin 2 of integrated circuit 90, through diode 86, comparator 28 will continue to "see" a low voltage at pin 5 and will maintain power transistor 82 "off". This is the manner in which latching transistor 88 "latches" power transistor 82.

Latching transistor 88 remains "on" as long as a sufficient voltage is present at its base terminal. Voltage is supplied to latching transistor 88 through resistors 122, 124 from regulated voltage VREG and reconnect comparator 30. Reconnect comparator 30 maintains a voltage at pin 1 of integrated circuit 90 as long as the voltage at pin 6 is less than approximately 3.40 volts, corresponding to a voltage in the power line 22 of approximately 13.8 volts (VREF3). Thus, latching transistor 88 remains "on", keeping power transistor 82 "off", until the voltage in power line 22 exceeds approximately 13.8 volts, at which time the latching transistor turns "off" and the power transistor turns "on", thereby reconnecting the electronic devices to the power line 22.

Applicant's preferred specifications for the individual components shown in FIG. 2 are as follows:
Relay 20—30 amp;
Diode 66—15 amp;
Power transistor 82—ECG2396;
Transorb 78—ECG1V017;
Transistor 58—TIP120;
Latching transistor 88—2N2222A;
Regulated power source 72—5 volt regulator;
Diodes 64, 65, 68, 70, 86—1 amp;
Resistor 84—1 KΩ, ¼ W, 1%;
Resistor 60—5 KΩ, ¼ W, 1%;
Resistors 80, 122—2 KΩ, ¼ W, 1%;
Resistors 108, 106, 104, 124—10 KΩ, ¼ W, 1%;
Resistors 114, 112, 110—3.3 KΩ, ¼ W, 1%;
Resistor 102—7.68 KΩ, ¼ W, 1%;
Resistors 96, 94, 92—4.02 KΩ, ¼ W, 1%;
Resistor 100—4.99 KΩ, ¼ W, 1%;
Resistor 98—5.49 KΩ, ¼ W, 1%;
Capacitors 76, 116, 118, 120—220 µF@16 V;
Capacitor 62—1000 µF@16 V;
Integrated circuit 90—LM239N;
Isolation battery 24—able to supply 15 amps for 5 min.

Figure 3:
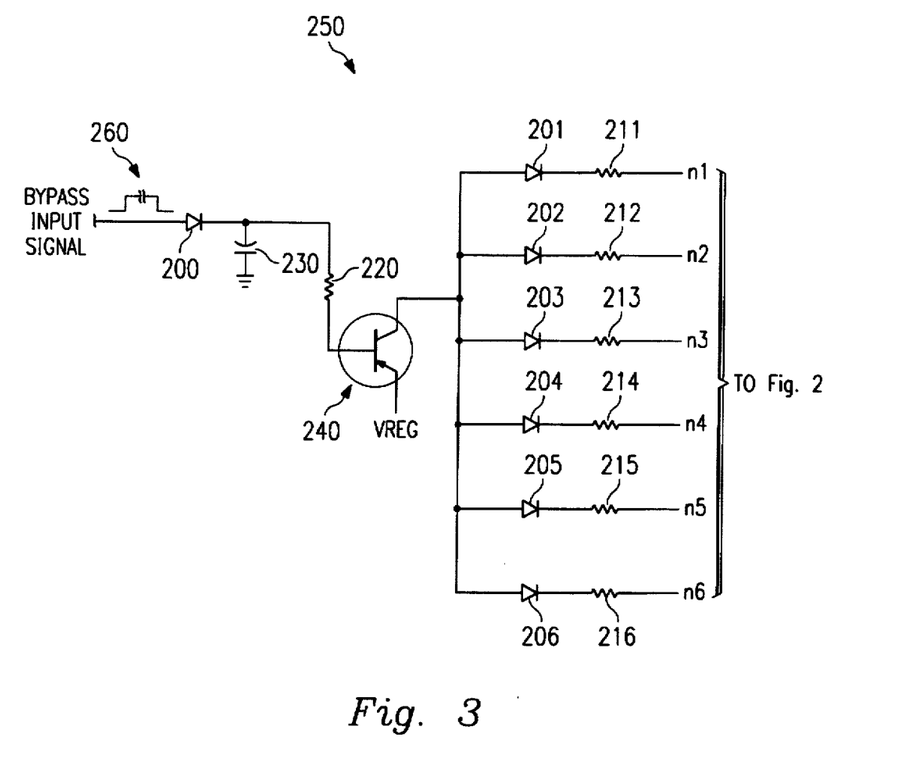
FIG. 3 is a schematic circuit diagram illustrating the bypass circuit of the present invention.

FIG. 3 provides a detailed circuit diagram showing the individual components of the bypass circuit 250 for the present invention. The bypass circuit 250 is interconnected to apparatus 10 at nodes n1, n2, n3, n4, n5, and n6 as shown in FIG. 2. It should be noted that nodes n1, n2, n3, n4, n5 and n6 correspond to pins 4, 5, 6, 7, 8, and 9 of integrated circuit 90. These pins are the A and B terminals of comparators 26, 28, and 30 as discussed above.

When an electronic device which draws temporarily high current from the vehicle's electrical system is started, a bypass input signal 260 is received by the bypass circuit 250. The bypass input signal 260 passes through diode 200 to resistor 220 and capacitor 230. Diode 200 ensures that current cannot pass back to the electronic device via the bypass input signal line. Capacitor 230 is connected to ground and is charged by the bypass input signal 260. Resistor 220 connects the bypass input signal 260 to the base terminal of transistor 240. The emitter terminal of transistor 240 is connected to the regulated voltage VREG and the collector terminal is connected to resistors 211, 212, 213, 214, 215, and 216 through diodes 201, 202, 203, 204, 205 and 206, respectively. Resistors 201, 202, 203, 204, 205, and 206 connect diodes 201, 202, 203, 204, 205 and 206 to nodes n1, n2, n3, n4, n5, and n6, respectively.

When bypass input signal 260 is received, transistor 240 is turned "on" which overrides or shifts all references voltages at nodes n1, n2, n3, n4, n5, and n6 via diodes 201, 202, 203, 204, 205, and 206 and resistors 211, 212, 213, 214, 215, and 216. As nodes n1, n2, n3, n4, n5, and n6 are connected to the A and B terminals of the comparators' 26, 28, 30 via pins 4, 5, 6, 7, 8, and 9 of integrated circuit 90, this effectively bypasses the comparators' 26, 28, 30 ability to monitor the reference voltages VREF1, VREF2, and VREF3 and thereby ensures that the comparators 26, 28, and 30 will not change states while the bypass input signal 260 is activated. When the bypass input signal 260 is removed, capacitor 230 maintains a voltage on the base terminal of transistor 240 for a predetermined delay period which effectively maintains the bypass of the comparators 26, 28, 30. Applicant's preferred delay period is approximately 10 seconds. After this delay period, the reference voltages VREF1, VREF2, and VREF3 on the comparators 26, 28, 30 are returned to normal and the comparators resume monitoring the system voltage with respect to the reference voltages.

Applicant's preferred specifications for the individual components shown in FIG. 3 are as follows:
Diodes 200, 201, 202, 203, 204, 205, 206—1 amp;
Resistors 211, 212, 213, 214, 215, 216—1 KΩ, ¼ W, 1%;
Transistor 240—2N2222A;
Comparator 230—470 µF@16 V;
Resistor 220—10K, ¼ W, 1%.

Thus, there has been descried herein, an apparatus for protecting electronic devices and preventing the electronic devices from discharging the vehicle's battery. Those skilled in the art, however, will recognize that many modifications and variations besides those specifically mentioned herein may be made without departing substantially from the concept of the present invention. Accordingly, it should be clearly understood that the form of the invention described herein is exemplary only and is not intended as a limitation on the scope of the invention. The use of the disclosed apparatus will permit vehicle owners to more conveniently and reliably utilize electronic devices in their vehicles. The electronic devices are prevented from overly discharging the vehicle's battery, and the vehicle's electrical system is prevented from damaging the electronic devices during engine starting. In addition, a warning is given to the operator that the battery is being unacceptably discharged so that remedial measures may be taken. Further, when the battery voltage drops below an acceptable level, the operator may select the disclosed apparatus to send a restart signal to means for automatically restarting the vehicle's engine and charging system. And finally, the apparatus is designed to bypass its normal operation to accommodate electronic devices, such as electric engine block heaters and the like, which draw high initial currents thereby temporarily lowering the voltage in the vehicle's electrical system.

What is claimed is:

1. A circuit for protecting an electronic device operatively installed in a vehicle from voltage spikes and surges produced when the vehicle is started, the vehicle having an electrical system which connects the electronic device to a battery included in the electrical system, and for preventing the electronic device from discharging the battery below an acceptable level, the circuit comprising:

first determining means for determining when the battery has been discharged below a first voltage level;

first disconnecting means, connected to said first determining means, for disconnecting the electronic device from the electrical system when the battery has been discharged below said first voltage level, the remainder of the electrical system remaining connected to the battery;

sensing means for sensing when the vehicle is being started;

second disconnecting means, connected to said sensing means, for disconnecting, the electronic device from the electrical system when the vehicle is being started;

second determining means for determining when the battery is being charged above a second voltage level;

first reconnecting means for reconnecting the electronic device to the electrical system, after the electronic device has been previously disconnected from the electrical system by said first disconnecting means, when said second determining means indicates the battery is being charged above said second voltage level;

second reconnecting means for reconnecting the electronic device to the electrical system, after the electronic device has been previously disconnected from the electrical system by said second disconnecting means, when said sensing means indicates the vehicle is not being started;

third determining means for determining when the battery has been discharged below a third voltage level, said third voltage level higher than said first voltage level; and automatic restart means, connected to said third determining means, for automatically starting the vehicle to recharge the vehicle's battery when the battery has been discharged below said third voltage level.

2. The circuit according to claim 1, further comprising switch means, connected to said third determining means, for permitting said operator to select from among an audible warning means, a visible warning means, and said automatic restart means.

3. The circuit according to claim 1, wherein said first disconnecting means comprises a power transistor connected intermediate the electrical system and the electronic device.

4. The circuit according to claim 1, wherein said second disconnecting means comprises a relay connected intermediate the electrical system and the electronic device.

5. The circuit according to claim 1, further comprising switch means, selectively coupling to said third determining means with an audible warning means, a visual warning means, and said automatic restart means to be activated when the battery has been discharged below said third voltage level.

6. The circuit according to claim 1, further comprising a voltage reference source connected to the electrical system for producing said first voltage level and said second voltage level and said third voltage level.

7. The circuit according to claim 6, wherein said first determining means comprises a comparator connected to said voltage reference source, the electrical system, and said first disconnecting means.

8. The circuit according to claim 6, wherein said second determining means comprises a comparator connected to said voltage reference source, the electrical system, and said first reconnecting means.

9. The circuit according to claim 6, wherein said third determining means comprises a comparator connected to said voltage reference source, the electrical system, and said automatic restart means.

10. Apparatus for protecting an electronic device installed in a vehicle, the vehicle having an engine and an electrical system for supplying voltage to operate the electronic device, the electrical system including a battery having a first voltage, an alternator producing a second voltage when being driven by the vehicle's engine, and a charging circuit for charging the battery with the second voltage produced by the alternator, the electrical system having a first state in which the engine is not running, a second state in which the engine is being started, and a third state in which the engine is running, and an operator of the vehicle selecting from among the first, second, and third states, the apparatus comprising:

a power transistor for electrically connecting and disconnecting the electronic device from the electrical system;

a voltage reference source, connected to the electrical system, for producing a first and second predetermined reference voltage, said first reference voltage being less than said second reference voltage;

a first comparator, connected to the electrical system and said voltage reference source, for comparing the first voltage to said first reference voltage and activating said power transistor to disconnect the electronic device from the electrical system when the first voltage is less than said first reference voltage;

an automatic restart signal for automatically starting the vehicle's engine to recharge the battery with the second voltage produced by the alternator when the first voltage is less than said second predetermined reference voltage;

a second comparator, connected to the electrical system and said voltage reference source, for activating said automatic restart signal when the first voltage is less than said second predetermined reference voltage;

a third comparator, connected to the electrical system and said voltage reference source, for activating said power transistor to connect the electronic device to the electrical system when the alternator is producing the second voltage, the electrical system being in the third state;

a start signal activated when the electrical system is in the second state; and a relay, connected to said start signal, for disconnecting the electronic device from the electrical system when the electrical system is in the second state.

11. The apparatus according to claim 10, further comprising a secondary battery for supplying power to the electronic device when said relay disconnects the electronic device from the electrical system.

12. The apparatus according to claim 10, further comprising a first time delay circuit connected to said relay for continuing to disconnect the electronic device from the electrical system for a predetermined period of time after the electrical system is no longer in the second state.

13. The apparatus according to claim 10, further comprising an integrated circuit which includes said first, said second, and said third comparators.

14. The apparatus according to claim 10, further comprising, a switch circuit selectively coupling said second comparator to an audible warning signal, a visible warning signal, and said automatic restart signal.

15. A circuit for protecting an electronic device operatively installed in a vehicle from voltage spikes and surges produced when the vehicle is started, the vehicle having an electrical system which connects the electronic device to a battery included in the electrical system, and for preventing the electronic device from discharging the battery below an acceptable level, the circuit comprising:

first determining means for determining when the battery has been discharged below a first voltage level;

first disconnecting means, connected to said first determining means, for disconnecting the electronic device from the electrical system when the battery has been discharged below said first voltage level, the remainder of the electrical system remaining connected to the battery;

sensing means for sensing when the vehicle is being started;

second disconnecting means, connected to said sensing means, for disconnecting the electronic device from the electrical system when the vehicle is being started;

second determining means for determining when the battery is being charged above a second voltage level;

first reconnecting means for reconnecting the electronic device to the electrical system, after the electronic device has been previously disconnected from the electrical system by said first disconnecting means, when said second determining means indicates the battery is being charged above said second voltage level;

second reconnecting means for reconnecting the electronic device to the electrical system, after the electronic device has been previously disconnected from the electrical system by said second disconnecting means, when said sensing means indicates the vehicle is not being started; and bypass means which overrides said first determining means and said second determining means, and prevents the apparatus from connecting or disconnecting electronic devices, when a bypass input signal is received.

16. The circuit according to claim 15, wherein said first disconnecting means comprises a power transistor connected intermediate the electrical system and the electronic device.

17. The circuit according to claim 15, wherein said second disconnecting means comprises a relay connected intermediate the electrical system and the electronic device.

18. The circuit according to claim 15, further comprising bypass delay means connected to said bypass means for continuing to bypass said determining means for a predetermined period of time after the bypass input signal is deactivated.

19. The circuit according to claim 15 further comprising:

third determining means for determining when the battery has been discharged below a third voltage level, said third voltage level higher than said first voltage level; and warning means, connected to said third determining means, for warning an operator of the vehicle that the battery has been discharged below said third voltage level and that remedial action is necessary to prevent disconnection of the electronic device from the electrical system.

20. The circuit according to claim 19, wherein said bypass means also overrides said third determining means.

21. The circuit according to claim 19, wherein said warning means includes switch means for permitting said operator to select from among an audible warning means and a visible warning means to be operated by said warning means.

22. The circuit according to claim 21, wherein said switch means further allows the operator to select automatic restart means to be activated when the battery has been discharged below said third voltage level.

23. The circuit according to claim 15, further comprising a voltage reference source connected to the electrical system for providing said first voltage level and said second voltage level.

24. The circuit according to claim 23, wherein said first determining means comprises a comparator connected to said voltage reference source, the electrical system, and said first disconnecting means.

25. The circuit according to claim 23, further comprising:

third determining means for determining when the battery has been discharged below a third voltage level, said third voltage level higher than said first voltage level.

26. The circuit according to claim 25, further comprising:

warning means, connected to said third determining means, for warning an operator of the vehicle that the battery has been discharged below said third voltage level and that remedial action is necessary to prevent disconnection of the electronic device from the electrical system.

27. The circuit according to claim 25, wherein said bypass means also overrides said third determining means.

28. Apparatus for protecting an electronic device installed in a vehicle, the vehicle having an engine and an electrical system for supplying voltage to operate the electronic device, the electrical system including a battery having a first voltage, an alternator producing a second voltage when being driven by the vehicle's engine, and a charging circuit for charging the battery with the second voltage produced by the alternator, the electrical system having a first state in which the engine is not running, a second state in which the engine is being started, and a third state in which the engine is running, and an operator of the vehicle selecting from among the first, second, and third states, the apparatus comprising:

a power transistor for electrically connecting and disconnecting the electronic device from the electrical system;

a voltage reference source, connected to the electrical system, for producing a first and a second predetermined reference voltage, said first reference voltage being less than said second reference voltage;

a first comparator, connected to the electrical system and said voltage reference source, for comparing the first voltage to said first reference voltage and activating said power transistor to disconnect the electronic device from the electrical system when the first voltage is less than said first reference voltage;

a warning circuit for warning the operator that remedial action is necessary to prevent disconnection of the electronic device from the electrical system, said warning circuit issuing a warning when the first voltage is less than said second predetermined reference voltage;

a second comparator, connected to the electrical system and said voltage reference source, for activating said warning circuit when the first voltage is less than said second predetermined reference voltage;

a third comparator, connected to the electrical system and said voltage reference source, for activating said power transistor to connect the electronic device to the electrical system when the alternator is producing the second voltage, the electrical system being in the third state;

a sensing circuit for sensing when the electrical system is in the second state;

a relay, connected to said sensing circuit, for disconnecting the battery from the electronic device from the electrical system when the electrical system is in the second state; and a bypass circuit, connected to and overriding said first, said second, and said third comparators, in response to a bypass input signal indicating an electronic device requiring a temporarily high initial current has been started.

29. The apparatus according to claim 28, further comprising a secondary battery for supplying power to the electronic device when said relay disconnects the electronic device from the electrical system.

30. The apparatus according to claim 28, further comprising a first time delay circuit connected to said relay for continuing to disconnect the electronic device from the electrical system for a predetermined period of time after the electrical system is no longer in the second state.

31. The apparatus according to claim 28, further comprising a bypass time delay circuit connected to said bypass circuit for continuing to bypass said first, said second, and said third comparators for a predetermined period of time after the bypass input signal is deactivated.

32. The apparatus according to claim 28, further comprising an integrated circuit which includes said first, said second, and said third comparators.

33. The apparatus according to claim 28, wherein said warning circuit comprises a switch for permitting the operator to select from among an audible warning signal and a visible warning signal.

34. The apparatus according to claim 33, wherein said switch further allows the operator to select an automatic restart signal to be activated when the battery has been discharged below said third voltage level.

* * * * *